United States Patent [19]

Edwards, Jr.

[11] 4,053,681

[45] Oct. 11, 1977

[54] ADDITIVES FOR IMPROVED POLYESTER AND VINYL POLYMER COMPOSITIONS

[75] Inventor: Harold R. Edwards, Jr., Geneva, Ill.

[73] Assignee: Standard Oil Company (Indiana), Chicago, Ill.

[21] Appl. No.: 661,485

[22] Filed: Feb. 26, 1976

[51] Int. Cl.$^2$ .................. B32B 17/10; C08K 5/12; C07C 69/76
[52] U.S. Cl. .................. 428/431; 260/31.6; 260/31.8 A; 260/31.8 B; 260/31.8 HR; 428/430; 428/441; 428/481; 428/920; 260/54; 260/76; 260/4 R
[58] Field of Search ...... 260/475 P, 31.8 B, 31.8 XA, 260/31.8 HR, 31.6, 31.8 A; 428/430, 431, 480, 481, 920, 441

[56] References Cited

U.S. PATENT DOCUMENTS

| | | | |
|---|---|---|---|
| 1,786,404 | 12/1930 | Young | 260/475 P |
| 3,026,228 | 3/1962 | Robinson | 428/430 |
| 3,043,792 | 7/1962 | Hurwitz | 260/31.8 B |
| 3,250,738 | 5/1966 | Isaacs | 260/475 P |
| 3,345,339 | 10/1967 | Parker | 260/861 |
| 3,367,992 | 2/1968 | Bearden | 260/837 R |
| 3,432,478 | 3/1969 | May | 260/475 P |
| 3,639,329 | 2/1972 | Thompson | 260/31.8 B |
| 3,956,220 | 5/1976 | Riem | 260/31.8 B |

*Primary Examiner*—Ellis Robinson
*Attorney, Agent, or Firm*—Wallace L. Oliver; Arthur G. Gilkes; William T. McClain

[57] ABSTRACT

A reactive additive is disclosed to improve flexibility and toughness in polyester and vinyl aromatic polymeric compositions. The additive is formed as the reaction product of a polyfunctional acid or anhydride, a glycol, an unsaturated acid and a mono alcohol.

11 Claims, No Drawings

ADDITIVES FOR IMPROVED POLYESTER AND VINYL POLYMER COMPOSITIONS

BACKGROUND OF THE INVENTION

This invention relates to additives for polyester and vinyl aromatic polymeric compositions.

There is a need for more flexible corrosion-resistant resin products such as glass fiber/unsaturated polyester products and vinyl aromatic polymers. The brittleness of present corrosion-resistant isopolyesters is a drawback in the manufacture and subsequent handling of fiberglass tanks and pipes. Greater tensile elongation is an accepted criterion for the evaluation of such products. In polyesters, flexibility can be imparted to the resin by incorporating into the backbone of the polymer aliphatic dicarboxylic acids (e.g. adipic acid) or ether glycols (e.g. diethylene or dipropylene glycol), by reducing the degree of unsaturation or by using additives such as vinyl rubbers. Unfortunately, these methods suffer from inherent shortcomings such as higher cost, reduced corrosion resistance and a lower heat distortion temperature.

Flexibility also can be achieved by the addition of a plasticizer, however, generally these are not chemically bound within the crosslinked polymeric composition and thus can be leached from the gelled resin structure. An effective additive capable of imparting flexibility to unsaturated polyesters that cannot be leached from the resin would be of great interest to the industry. Further, an additive which also can impart toughness to a polyester or vinyl aromatic polymer would be useful in the industry.

SUMMARY OF THE INVENTION

My invention is a composition formed by reacting approximately equimolar amounts of (a) a di-, tri- or tetrasubstituted acid or anhydride, (b) a dihydric alcohol and (c) an unsaturated acid or anhydride and esterifying such reaction product with a mono alcohol such that the final acid number of the composition ranges from 0 to about 30. The resulting composition can be incorporated into glass fiber/polyester materials and vinyl aromatic polymers to produce improved properties.

BRIEF DESCRIPTION OF THE INVENTION

I have found a reactive additive which can be incorporated into polyesters to promote flexibility and into vinyl aromatic polymers to yield better flexural properties.

The reactive additives of this invention are formed by reacting approximately equimolar amounts of a di-, tri- or tetrasubstituted acid or anhydride, a dihydric alcohol and an unsaturated acid or anhydride and esterifying the product with a mono alcohol or a mixture of mono alcohols to an extent such that the acid number of the mixture is between 0 and about 30, preferably between 0 and about 10. The mono alcohol can be added either after all other reactants have been added or after the glycol addition or at both such times. A lower acid number in the product is needed for corrosion resistance.

The acid or anhydride on which my additive can be based is preferably a di-, tri- or tetrasubstituted aromatic acid such as phthalic anhydride, pyromellitic anhydride, isophthalic acid, trimellitic anhydride and the like. The preferably aromatic is trimellitic acid or anhydride (TMA). The dihydric alcohols useful in this invention include branched or unbranched aliphatic glycols containing 2 to 6 carbon atoms. Propylene glycol is preferred. The unsaturated acid or anhydride useful in this invention contains from about 2 to 18 carbon atoms and includes at least one carbon-carbon double bond. The preferable material is maleic anhydride, although acrylic acid, itaconic acid and the like can be utilized. The mono alcohols in this invention contain from about 2 to 18 (preferably 6 to 10) carbon atoms. Suitable alcohols include 2-ethylhexanol, n-octyl alcohol, benzyl alcohol and the like.

The reactive additive composition of this invention can contain a mixture of individual species. The reaction of a polyfunctional acid or anhydride with a glycol will yield a mixture of reaction products including a series of oligimers. If the acid (or anhydride) and alcohol are reacted in approximately equimolar amounts (e.g. within about 20%), the predominate product will be mono addition product.

A preferable additive is based on TMA and contains a predominate amount of material with the structure:

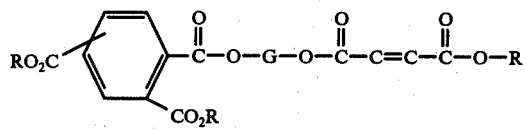

where G is in a divalent branched or unbranched aliphatic group containing from 2 to about 6 carbon atoms and R is either hydrogen, an aliphatic or aromatic hydrocarbon containing from 2 to about 18 carbon atoms or mixtures thereof.

The reactive additive of my invention can be incorporated into various polyester and vinyl aromatic polymeric compositions at levels ranging from about 2 to 50 wt.%. The polyester resins which are useful in connection with my invention include unsaturated polyesters with a clear resin casting elongation less than 2%. Particularly useful are unsaturated polyesters such as 1:1 (molar) isophthalic acid/maleic anhydride-10% hydroxyl excess propylene glycol (IPA/MA-PG) resin. Other preferred compositions include other IPA/MA-glycol resins where the glycol contains 2 to 5 carbon atoms.

Corrosion resistance testing (ASTM C581) of glass fiber/isopolyester laminates for periods up to one year show that incorporation of a 10% blend of a reactive additive of this invention (formed from TMA, propylene glycol, maleic anhydride and 2-ethylhexanol), improves resistance properties to a 5% sodium hydroxide solution over other resins. Although this blend became opaque and less resistant in organic solvents such as benzene, ethanol and gasoline, in some instances (especially in boiling water) it had an improved surface appearance evidenced by reduced crazing and blistering.

An especially useful material is an unsaturated polyester resin combined with from about 25 to 60 wt.% styrene monomer and preferably reinforced with from about 20 to 80 wt.% glass fibers. These polyester/glass fiber compositions preferably contain about 10 to 2 wt.% of my additive, although levels up to 25 wt.% can be operable.

Further, additives of my invention can be incorporated at suitable levels preferably ranging from about 2 to 10 wt.% in vinyl aromatic polymers such as styrene polymer to impart better flexural properties. To obtain an improved polymer an effective amount, typically from about 3 to 5 wt.%, of my additive is included within a vinyl aromatic polymerization feedstock polymerized using standard mass thermal, mass suspension or solution techniques.

In another embodiment of my invention, my additive can contain from about 10 to 50 wt.% of a halogen such as bromine and chlorine in its structure to provide flame retardance in a polyester or vinyl aromatic composition. Such halogenation can be introduced into the composition by using halogenated acids or anhydrides, glycols, mono alcohols or unsaturated acids or anhydrides. In this mode my additive will serve both as a flexibility or toughening aid and as a fire retardant vehicle. Additionally, up to about 10 wt.% of a flame retardant synergist such as antimony oxide should be included within these compositions.

Generally, the reactive plasticizer additives of my invention can be prepared by first reacting approximately equimolar amounts of a glycol and a polyfunctional aromatic acid. To this mixture a mono alcohol in suitable quantity can be added with heating and mixing, preferably with a small amount of an acid catalyst such as p-toluenesulfonic acid, to obtain an acid number of under about 50 to promote ease of handling. After excess alcohol has been removed, an unsaturated acid or anhydride is added. The basic function of the composition will not change. More alcohol then can be added to produce a product with an acid number between 0 and about 30. Another means to produce a low acid number product is to use acrylic or itaconic acids instead of the difunctional maleic anhydride. Within the scope of this invention, the reaction sequence can be altered by reacting the polyfunctional acid or anhydride, the glycol and the unsaturated acid or anhydride in various sequences. The mono alcohol, however, should be added either last or after the glycol addition. Although the sequence of reactant addition can alter the relative proportions in the resulting mixed composition, the character of the components in such composition should remain the same.

My invention is demonstrated but not limited by the following Examples.

EXAMPLES I–II

A reactive plasticizer of my invention was prepared in a 2000 milliliter flask by adding one mole of TMA to one mole of propylene glycol heated to 312° F and to this mixture in succession 2.2 moles of 2-ethylhexanol and p-toluenesulfonic acid (2.2 wt.% based on TMA). The resulting mixture was heated and stirred to a maximum temperature of 370° F and to an acid number of 3, after which the material was vacuum stripped for 15 minutes to remove excess alcohol and one mole of maleic anhydride added to the resin at 330° F. After the reaction was complete this resin was blended into a 1:1 isophthalic anhydride/maleic anhydride-10% excess propylene glycol resin (IPA/MA-PG) and cast into one-eighth-inch sheets. Examples of such compositions and a comparative run are shown in Table I. These examples show increased flexibility as evidenced by an elongation increase coupled with a modulus decrease.

TABLE I

|  | Example I | Example II | Run A |
|---|---|---|---|
| Additive (%) | 10 | 20 | none |
| IPA/MA-PG (%) | 45 | 35 | 55 |
| Styrene (%) | 45 | 45 | 45 |
| Barcol Hardness (Inst. 934-1) | 49–52 | 42–43 | 48–49 |
| Flexural Modulus ($10^6$ psi) | 0.548 | 0.449 | 0.571 |
| Flexural Strength (psi) | 18700 | 17200 | 19600 |
| Tensile Modulus ($10^6$ psi) | 0.466 | 0.381 | 0.492 |
| Tensile Strength (psi) | 11200 | 9000 | 7500 |
| Tensile Elongation (%) | 2.93 | 3.47 | 1.56 |

EXAMPLES III–XI

A series of reactive plasticizers were prepared as described in Examples I and II with the constituents shown in Table II. These plasticizers were incorporated into one eighth inch clear castings prepared by catalyzing a IPA/MA-PG resin and styrene with 1% benzoyl peroxide and curing for sixteen hours at 135° F followed by a post-cure schedule of one hour each at 180°, 220° and 240° F. The properties of such castings are shown in Table III. Generally, castings incorporating additives of this invention tend to optimize strength in respect to flexibility.

TABLE II

| Components | Example III | Example IV | Example V | Example VI | Example VII | Example VIII |
|---|---|---|---|---|---|---|
| TMA (moles) | | | | | | |
| Isophthalic Acid (IPA) (moles) | 1.0 | | | | 1.0 | |
| Phthalic Anhydride (PA) (moles) | | 1.0 | | | | |
| Adipic Acid (AA) (moles) | | | | 1.0 | | 1.0 |
| Maleic Anhydride (MA) (moles) | 1.0 | 1.0 | 2.0 | 1.0 | 1.0 | 1.0 |
| Propylene Glycol (PG) (moles) | 1.1 | 1.0 | 1.05 | 1.1 | 1.1 | 1.1 |
| 2-Ethylhexanol (EH) (moles) | 2.2 | 2.2 | 2.2 | 2.2 | 2.2 | 2.2 |
| C-18 Alcohol (moles) | | | | | | |
| n-Octyl Alcohol (moles) | | | | | | |
| Final Acid Number (solids) | 14.2 | 14.6 | 13.5 | 12.6 | 12.4 | 12.5 |
| Comments | MA & EH added together | MA & EH added together | EH added at 315°; no water off | MA added initially; EH added after 20 ml H₂O came off | ½ IPA reacted before MA | ½ AA reacted before MA |

| | Example IX | Example X | Example XI | Run B |
|---|---|---|---|---|
| TMA (moles) | 1.0 | 1.0 | 1.0 | 1.0 |
| Isophthalic Acid (moles) | | | | |
| Phthalic Anhydride (moles) | | | | |
| Adipic Acid (moles) | | | | |
| Maleic Anhydirde (moles) | 1.0 | 0.75 | 1.0 | 1.0 |
| Propylene Glycol (moles) | 1.0 | 1.0 | 1.0 | 1.0 |
| 2-Ethylhexanol (moles) | 3.4 | 3.4 | | |
| C-18 Alcohol (males) | | | | 3.3 |
| n-Octyl Alcohol (moles) | | | 3.0 | |

TABLE II-continued

| | | | | |
|---|---|---|---|---|
| Final Acid Number (solids) | 20.4 | 14.4 | 4.5 | 13.8 |
| Comments | EH added before and after MA addition | Same as Example XI | neutralized with calcium hydroxide | All reactants added initially |

TABLE III

| Example (Run) | IIIA | IIIB | IVA | IVB | VA | VB | VIA | VIB | VIIIA | VIIIB |
|---|---|---|---|---|---|---|---|---|---|---|
| Plasticizer (%) | 10 | 20 | 10 | 20 | 10 | 20 | 10 | 20 | 10 | 20 |
| IPA/MA-PG resin (%) | 45 | 35 | 45 | 35 | 45 | 35 | 45 | 35 | 45 | 35 |
| Styrene (%) | 45 | 45 | 45 | 45 | 45 | 45 | 45 | 45 | 45 | 45 |
| Flexural Modulus ($10^6$ psi) | .561 | .530 | .554 | .482 | .528 | .447 | .525 | .350 | .450 | .504 |
| Flexural Strength (psi) | 20,800 | 18,500 | 21,600 | 16,700 | 18,500 | 17,400 | 19,700 | 11,800 | 22,900 | 18,400 |
| Tensile Modulus ($10^6$ psi) | .540 | .474 | .534 | .443 | .500 | .441 | .495 | .314 | .494 | .450 |
| Tensile Strength (psi) | 9,300 | 10,800 | 9,700 | 9,500 | 9,000 | 8,400 | 10,100 | 6,500 | 8,800 | 10,400 |
| Tensile Elongation (%) | 2.03 | 4.02 | 2.15 | 3.40 | 2.03 | 2.60 | 2.80 | 9.53 | 1.87 | 3.60 |
| Barcol Hardness (Inst. 934-1) | 45–46 | 40 | 44 | 38 | 44 | 40 | 38 | 22 | 48 | 37 |
| Heat Distortion Temp. (° F) | 198 | 160 | 187 | 147 | 210 | 192 | 189 | 136 | 197 | 158 |

| Example (Run) | IXA | IXB | XI | XIIA | XIIB | XIII | (B) | (C) | (D) |
|---|---|---|---|---|---|---|---|---|---|
| Plasticizer (%) | 10 | 20 | 10 | 10 | 20 | 10 | 10 | none | none |
| IPA/MA resin (%) | 45 | 35 | 45 | 45 | 35 | 45 | 45 | 55 | 50 |
| Styrene (%) | 45 | 45 | 45 | 45 | 45 | 45 | 45 | 45 | 50 |
| Flexural Modulus ($10^6$ psi) | .520 | .341 | *.571–.494 | .521 | .261 | .500 | .533 | .571 | .602 |
| Flexural Strength (psi) | 21,200 | 12,300 | *21,000–20,100 | 18,900 | 9,500 | 13,200 | 18,200 | 19,600 | 18,600 |
| Tensile Modulus ($10^6$ psi) | .444 | .304 | .455 | .477 | .230 | .46 | .488 | .492 | .585 |
| Tensile Strength (psi) | 9,000 | 6,500 | 10,200 | 10,700 | 5,400 | 4,300 | 7,800 | 7,500 | 5,700 |
| Tensile Elongation (%) | 2.30 | 4.20 | 2.90 | 3.27 | 12.1 | 1.0 | 2.20 | 1.56 | 1.10 |
| Barcol Hardness (Inst. 934-1) | 40 | 24 | *43–45, 48 | 48–51 | 25–28 | 33 | 46–49 | 48–49 | — |
| Heat Distortion Temp. (° F) | 183 | 145 | *197 | 189 | 149 | 226 | 212 | 241 | — |

*Sample treated with Ca(OH)₂. Other properties obtained from a resin of Example XI not treated with calcium hydroxide.

EXAMPLE XII

One mole each of TMA and propylene glycol were heated to 300° F in a 2000 milliliter flask. One mole of maleic anhydride was added and the mixture reheated to 300° F. Three moles of tribromoneopentyl alcohol was added and this mixture heated to above 374° F and stirred to an acid number of 40. The resulting product was cooled and blended with styrene to 78 NVM (non-volatile material). A blend with a standard IPA/MA-PG polyester was formed and the properties of a one-eighth inch clear casting of such blend are shown in Table IV. This material shows fire retardance properties.

TABLE IV

| | |
|---|---|
| Additive (%) | 41.6 |
| IPA/MA-PG (%) | 27.2 |
| styrene (%) | 31.2 |
| bromine in total resin (%) | 23.2 |
| Gardner-Holdt viscosity | X |
| Brookfield Viscosity (cps. at 77° F.) | 2760 |
| Weight/Gallon (lbs at 77° F.) | 10.7 |
| Gardner color | 4 |
| Acid number (solid basis) | 31.5 |
| Flexural Modulus ($10^6$ psi) | 0.628 |
| Flexural Strength (psi) | 10,200 |
| Tensile Modulus ($10^6$ psi) | 0.543 |
| Tensile Strength (psi) | 6,250 |
| Tensile Elongation (%) | 1.2 |
| Barcol Hardness (Inst. 934-1) | 49–50 |
| HLT-15 fire retardance rating | 100 |

EXAMPLE XIII

Styrene was polymerized under mass suspension conditions incorporating the additive of Example X and tested for toughness. A similarly prepared sample of polystyrene without such an additive also was tested (Run E). The results of these tests are shown in Table V. The polystyrene specimen of this Example was clear and dark and did show improved flexural strength.

TABLE V

| Components (parts by weight) | Example XIII | Run E |
|---|---|---|
| Styrene | 900 | 900 |
| Additive | 27 | None |
| Water | 2,100 | 2,100 |
| Benzoyl peroxide | 4.5 | 4.5 |
| Natrosol 250 HR (1) | 5.25 | 5.25 |
| Lupersol 259 (2) | 0.9 | 0.9 |
| Properties | | |
| Flexural Modulus ($10^6$ psi) | 0.477 | 0.490 |
| Flexural Strength (psi) | 4,890 | 4,000 |
| Barcol Hardness (Inst. 934-1) | 30 | 32 |

(1) cellulose gum used as a thickener in suspension polymerization
(2) peroxide catalyst.

I claim:

1. A composition formed by reacting approximately equimolar amounts of (a) trimellitic acid or anhydride, (b) a dihydric alcohol containing from 2 to about 6 carbon atoms, and (c) an unsaturated acid or anhydride containing from 2 to about 6 carbon atoms and esterifying such reaction product with sufficient amounts of mono alcohol containing from 2 to about 18 carbon atoms to form a product with an acid number between about 0 and 30.

2. The composition of claim 1 wherein the dihydric alcohol is propylene glycol.

3. A glass fiber/unsaturated polyester laminate containing about 2 to 25 wt.% of the composition of claim 1, about 25 to 60 wt.% styrene monomer, and about 20 to 80 wt.% glass fibers.

4. A vinyl aromatic polymer composition containing from about 2 to 10 wt.% of the composition of claim 1.

5. A glass fiber/unsaturated polyester laminate containing about 2 to 10 wt.% of the composition of claim 2 about 25 to 60 wt.% styrene monomer, and about 20 to 80 wt.% glass fibers.

6. A composition prepared by (a) forming a first reaction product by reacting approximately equimolar amounts of trimellitic acid or anhydride and a dihydric alcohol containing from 2 to about six carbon atoms; (b) to such first reaction product adding sufficient amounts of monoalcohol containing from 2 to about 18 carbon atoms to form a second reaction product with an acid number between about 0 and 50; (c) to such second reaction product adding an approximately molar equivalent amount of an unsaturated acid or anhydride containing from 2 to about 6 carbon atoms; and (d) adding sufficient amounts of such monoalcohol to the resulting product to form a composition with an acid number between about 0 to 30.

7. A glass fiber/unsaturated polyester laminate containing about 2 to about 10 wt.% of the composition of claim 6, about 25 to 60 wt.% styrene monomer, and about 20 to 80 wt.% glass fibers.

8. A styrene polymer composition containing from about 2 to 10 wt.% of the composition of claim 6.

9. The composition of claim 6 wherein the dihydric alcohol is propylene glycol.

10. The composition of claim 9 wherein the unsaturated acid or anhydride is maleic anhydride.

11. A glass fiber/unsaturated polyester laminate containing about 2 to 10 wt.% of the composition of claim 10, about 25 to 60 wt.% styrene monomer, and about 20 to 80 wt.% glass fibers.

* * * * *